United States Patent [19]

Sanders

[11] 3,959,925
[45] June 1, 1976

[54] MECHANIZED BARK HACK
[75] Inventor: Donald W. Sanders, Auburn, Ala.
[73] Assignee: The United States of America as represented by the Secretary of Agriculture, Washington, D.C.
[22] Filed: Apr. 18, 1975
[21] Appl. No.: 569,530

[52] U.S. Cl.................................... 47/12; 30/379
[51] Int. Cl.² ......................................... A01G 23/10
[58] Field of Search.......... 30/373, 379; 144/208 R, 144/208 K; 47/12

[56] References Cited
UNITED STATES PATENTS

| 2,601,366 | 6/1952 | Chapman | 30/379 |
| 2,725,674 | 12/1955 | Burney | 47/12 |
| 2,738,620 | 3/1956 | Roberts | 47/12 |
| 2,932,127 | 4/1960 | Prance et al. | 47/12 |
| 3,121,974 | 2/1964 | Brantley et al. | 47/12 |

FOREIGN PATENTS OR APPLICATIONS

| 233,767 | 1/1910 | Germany | 47/12 |

Primary Examiner—Robert E. Bagwill
Attorney, Agent, or Firm—M. Howard Silverstein; David G. McConnell; Max D. Hensley

[57] ABSTRACT

A tree bark scoring apparatus adapted for transport and for operation aboard a moving, dirigible and speed controllable prime mover.

10 Claims, 5 Drawing Figures

DIRECTION OF TRAVEL

MECHANIZED BARK HACK

The claimed apparatus is positioned at an approximate abeam location on the prime mover and consists of integrated, articulated components that function collectively to remove a strip of bark about two inches wide and extending some one-third the distance around the trunk of a standing, vital tree.

Bark removal is accomplished at a preselected height above the ground level while the prime mover is being driven forward, laterally past the tree.

Responsibility of the prime mover operator aside from guiding the prime mover past the tree selected for scoring is limited to the tasks of positioning the apparatus vertically and start-stop operation of the rotary bark abrading cutter head.

The apparatus consists of a rigid vertical boom providing principal apparatus support and height positioning capability, a horizontal oscillatory boom with one end slidably and rotatably linked to the said vertical boom. The horizontal boom comprises horizontally positioned and collectively oscillatory structural components including the boom terminal rotary, bark abrading cutter head which is extended via the boom beyond the lateral limits of the prime mover with clearance provided for about ninety degrees of resiliently controlled oscillatory horizontal movement of the boom and included cutter head abaft the normal abeam position relative the prime mover.

The structural components of the horizontal boom are severally connected serially by rotatable pivot linkages and sliding, reciprocating, telescopic linkages, the said linkages all provided with component intervening resilient, motion restraining means. The linkages and component interposed resilient, motion restraining means are adapted collectively to provide to the boom terminal, rotary, bark abrading cutter head, automatic, resiliently adjustable, universal motion in all planes, thereby to insure the correctly oriented position of the cutter head at its moment of dynamic contact with the tree trunk and thereafter to maintain resiliently oriented dynamic contact between cutter head and tree trunk with a force at least sufficient to urge the operating cutter head through the tree bark and down to the cambium layer. Resilient dynamic orientation and contact between the cutter head and tree is maintained until such time as the cutter head has abraded the requisite horizontal strip of bark about one-third the distance around the tree trunk, the constantly moving prime mover has carried the apparatus on past the scored tree beyond reach of the extended and abaft displaced boom and released the cutter head from tree contact. Release of the cutter head from tree contact allows the horizontal boom to swing forward and resume its normal position extended abeam the prime mover preparatory to contact of the cutter head with the next immediate tree selected for scoring.

The naval stores industry is one of the oldest in America, dating back to 1606 in Nova Scotia. The gum collection phase is still labor-intensive where hand-held tools, some powered and some not, are used by laborers walking through a stand of pines. A primary process in gum harvesting is the removal of a streak of bark approximately two inches wide from roughly one-third of the circumference of pine trees being tapped; the bark must be removed down to the cambium layer. The tool used for this purpose is called a bark hack. Evolution of this tool includes powering its blade with an oscillating air cylinder and development of a rotary-powered bark hack as early as 1949. But these changes still required that the tool be hand carried. Further mechanization has been held up by the lack of a machine that could automatically cut a streak a length of one-third the tree circumference, a problem the instant apparatus overcomes.

The apparatus of the instant invention is designed to enable a man riding on a suitable prime mover, such as a farm tractor, to remove mechanically a streak of bark from a pine tree being tapped for gum naval stores without dismounting the vehicle.

To be useful, an apparatus used to remove bark for pine gum collection must be able to remove the bark down to the cambium layer in a predetermined location on the tree for a distance of approximately one-third of the tree circumference for pine trees greater than eleven inches in diameter at breast height.

Broadly, the invention is an apparatus for abrading a selected area of bark from the trunk of a vital tree while mounted and operationally transported aboard a mobile, speed and direction controllable prime mover, said apparatus comprising a. cutter head means for abrading bark, said means located on a vertical axis and including a rotary cutter head;

b. means communicating with said cutter head means for powering said cutter head;

c. a yoke means for resiliently biasing said cutter head means to a predetermined orientation by the rotation of said yoke means about a horizontal axis passing through the same plane as said vertical axis;

d. torsion means communicating operatively with said cutter head means and yoke means, said torsion means for resiliently biasing said cutter head means about its axis to a predetermined orientation;

said cutter head means, said means for powering said cutter head, said yoke means and said torsion means forming a cutter head assembly;

e. swing means communicating with said yoke means for resiliently biasing said assembly to a predetermined position in an arc swept by said horizontal axis;

f. lift means communicating with said swing means for simultaneously moving said swing means and said assembly along an axis substantially parallel to said vertical axis;

g. means for powering said lift means; and h. means for mounting said lift means to said prime mover.

For a detailed description of the invention, reference is made to the accompanying drawings.

Figure 1:
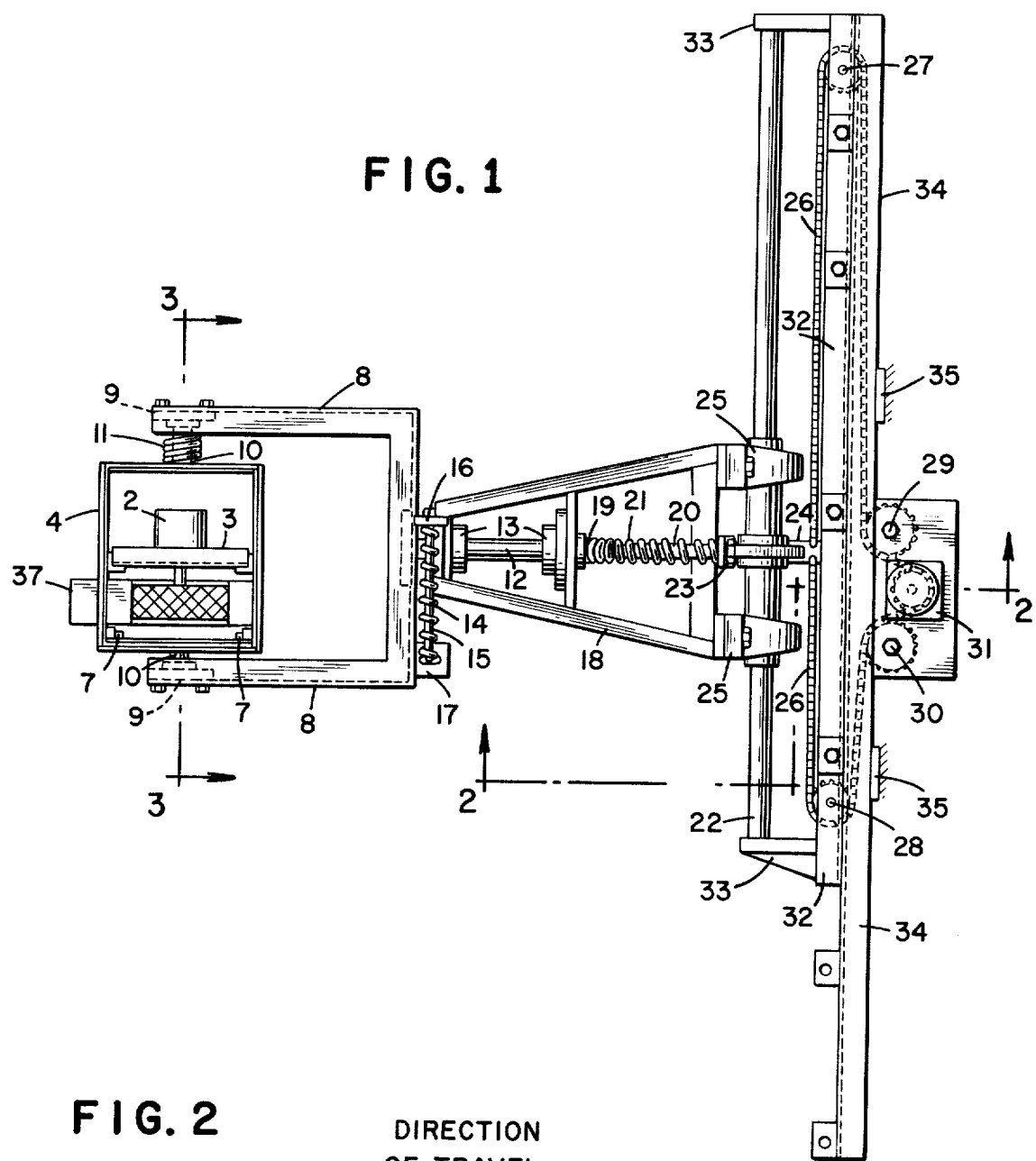
FIG. 1 is an elevation front view of the inventive apparatus. This is the view an observer would have if he were standing at the tree from which the bark is to be removed as the apparatus approaches.
Figure 2:
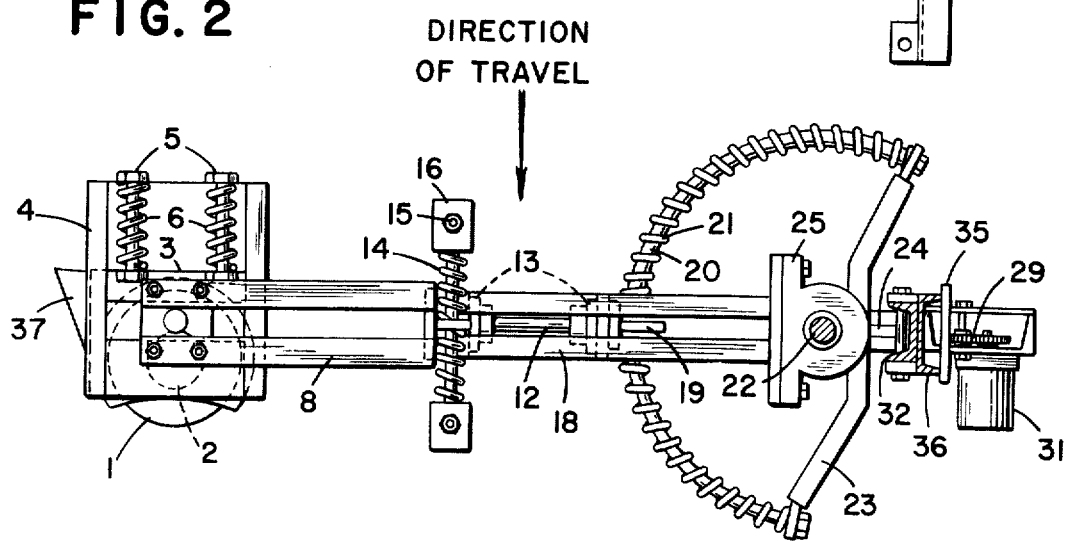
FIG. 2 is an elevation top view of the FIG. 1 apparatus.
Figure 3:
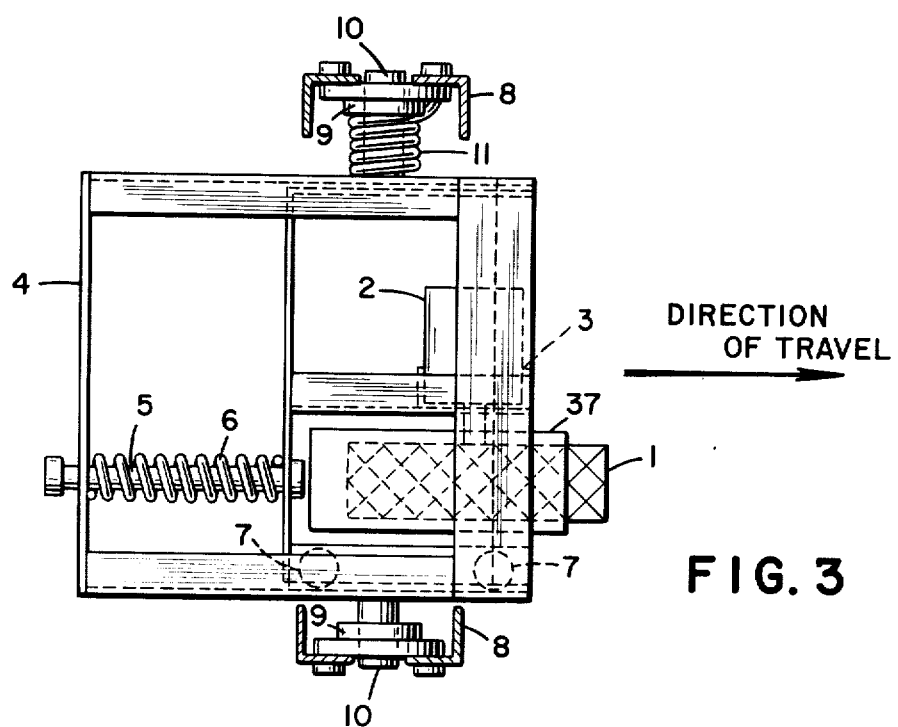
FIG. 3 is an enlarged side view of the FIG. 1 apparatus showing only the cutter head portion.
Figure 4:
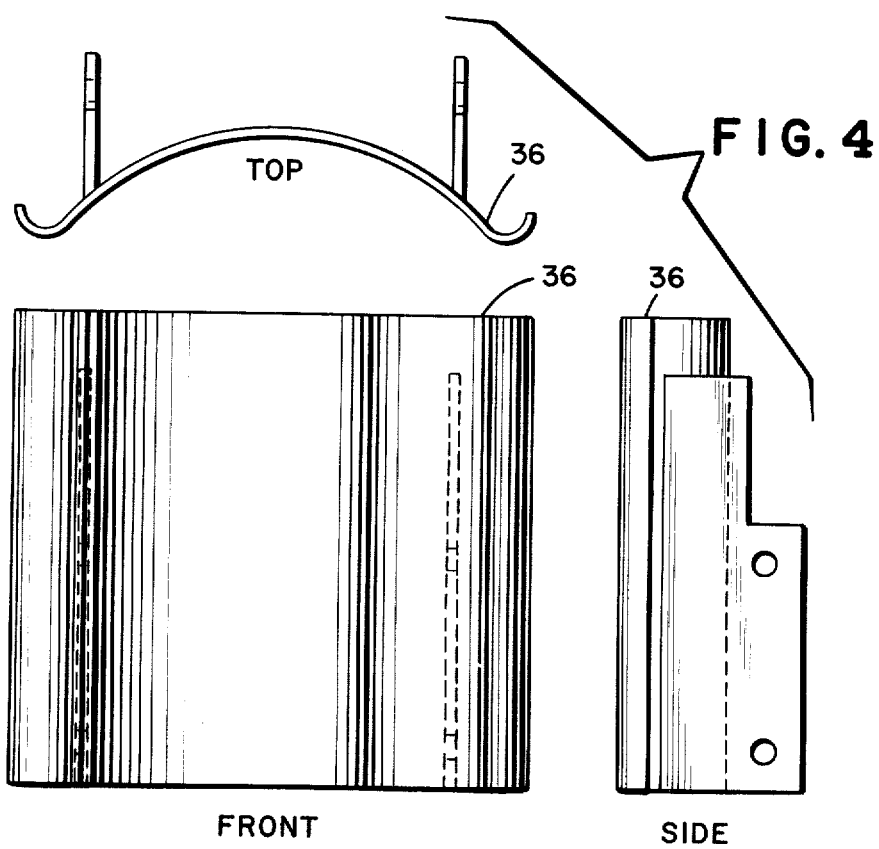

FIG. 4 contains three views of a shield plate which butts up against the tree to be streaked.

Figure 5:
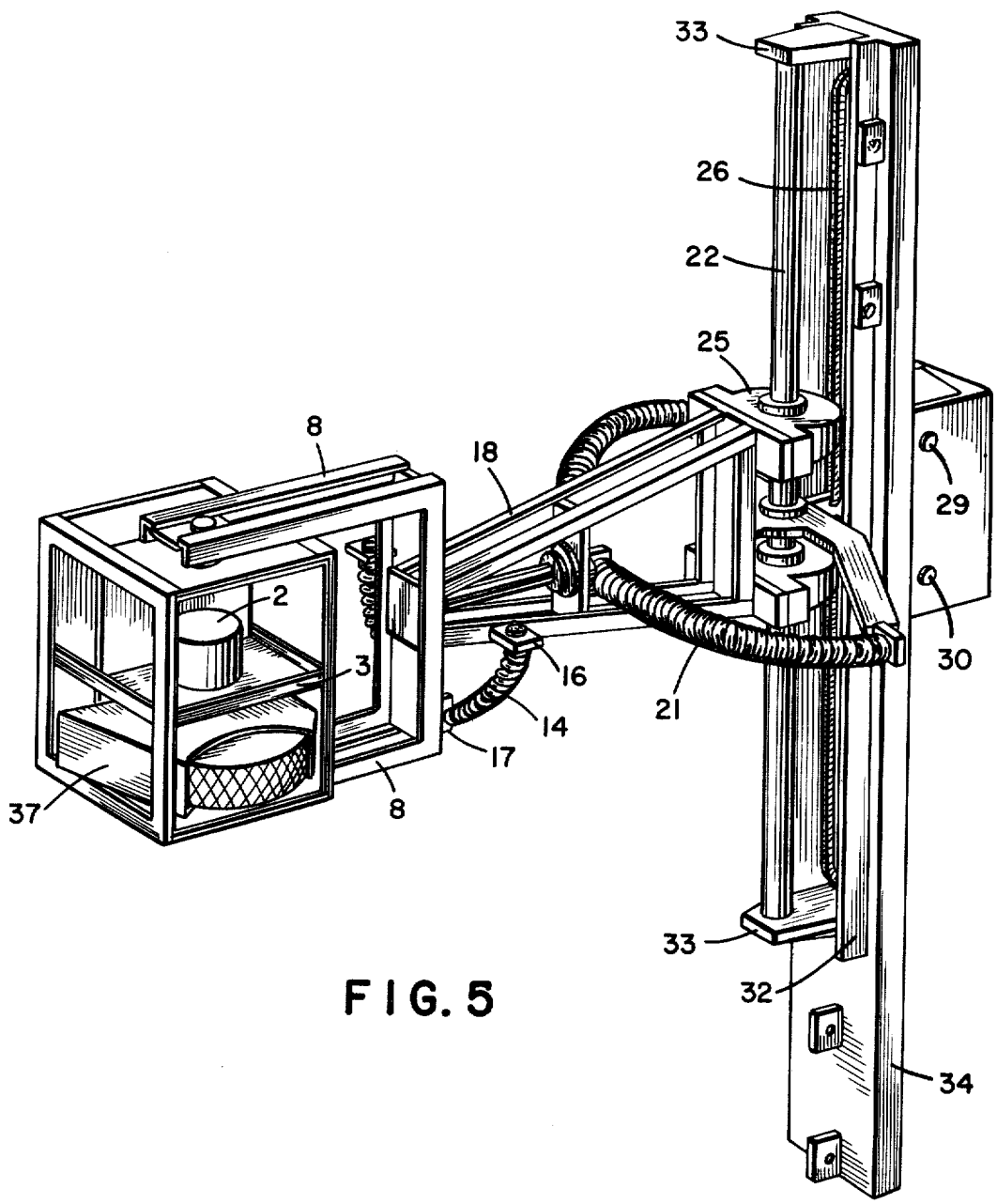

FIG. 5 is a perspective view of the apparatus.

A suitable rotary cutting head 1 and its power source 2 are mounted in a metal frame box 3. The cutter head is covered by guard 37 which also serves to divert bark chips away from the tree. Box 3 with the cutting head in it sits in another larger metal frame box 4. Box 3 is supported at the 4 corners by wheels 7, permitting it to roll in and out of box 4. The sheet metal shield 36 in FIG. 4 is capable of being fastened to the front of box 4. Box 3 is connected to box 4 by two long bolts 5. The bolts are fixed to box 3, but can slide through holes (not shown) in the back of box 4. On these bolts 5 are springs 6 which tend to push box 3 with its rotary cutting head to the front of box 4. The metal shield 36 when attached to the front of box 4 acts as a stop to box 3. The shield is attached to box 4 above where the cutting head would strike it, thus permitting the cutting head to protrude approximately 1¼ inches beyond the edge of the shield. This clearance is for penetration into the bark.

Box 4 is mounted in the U-shaped metal yoke 8 by two cylindrical metal shafts 10 attached to the top and bottom of the box. The shafts are held by two sealed flange bearings 9. The yoke 8 is of sufficient length that box 4 can rotate 180° within the yoke in bearings 9. Torsion spring 11 fits over shaft 10 and is attached to yoke 8 and box 4. As box 4 rotates in yoke 8, the torsion spring is loaded, tending to return box 4 to its present position.

Yoke 8 has fixed perpendicular to it a cylindrical metal shaft 12. Shaft 12 fits into two sealed flange bearings 13 which are mounted in the metal framework 18. Since shaft 12 is mounted in flange bearings, yoke 8 and thus box 4 are free to rotate back and forth. Yoke 8 is held in the present position by compression springs 14. Springs 14 slide over round rod 15 which is bent to form a semicircle. Bracket 16 is fixed to metal framework 18, and bracket 17 is fixed to yoke 8. Rod 15 slips through the slot in bracket 17, and the compression springs 14 slip over the ends of the rod. The ends of the rod are bolted to bracket 16. Thus, the compression springs tend to keep yoke 8 in the vertical position and cutter head 1 in the horizontal plane. Yoke 8 must be able to tilt forward or back slightly to accommodate leaning trees.

Metal framework 18 is designed to support yoke 8 at the proper distance from the prime mover to permit the cutter head to move around the tree one-third of its circumference as the prime mover passes by the tree. Metal framework 18 is attached to shaft 22 by two combination linear-motion-rotary-motion bearings 25 which permit the entire apparatus to move up and down as well as rotate around shaft 22. The up and down motion is needed to move the cutter head up and down for bark removal at different heights on the trees. The rotary motion is necessary to enable the cutter head to swing around the tree as the prime mover passes by the tree.

Once the prime mover passes the tree being streaked and the streak of bark has been removed, the cutter head, yoke, and framework must return to a position perpendicular to the direction of travel of the prime mover. This is accomplished automatically by a spring system. Springs are loaded on metal framework 18 through slotted bracket 19 which is attached to the framework. Bracket 19 is slotted to permit a circular rod 30 to pass through it. Rod 20 is bent to form a semicircle as shown and is passed through the slot in bracket 19. Springs 21 slip over rod 20 from each end and butt against bracket 19. The ends of rod 20 are fastened to arm 23.

Arm 23 is constructed of material strong enough to support the spring load caused when the apparatus rotates about shaft 22. Arm 23 is offset "in" to the rear to permit greater rotation of the apparatus before the spring jams, and arm 23 is attached to shaft 22 in such a manner that it will move up and down the shaft with the apparatus but will not rotate with arm 23, due to the attached mechanical stop 24. Thus when the apparatus swings back, the slotted bracket slides over rod 20 and compression forces build up in spring 21. As the prime mover passes the tree, these compression forces return the apparatus to its normal position.

To place a streak in the proper location up and down the tree, the cutter head is raised and lowered by a chain 26 attached to mechanical stop 24. The apparatus slides up and down shaft 22 as chain 26 pulls up or is wound down on the stop.

The apparatus raising and lowering system includes chain 26; idler sprockets 27, 28, 29, 30; and drive motor 31. The chain 26 is looped over the sprocket on drive motor 31 and around idler sprockets 29 and 30. Each end of chain 26 is looped over idler sprockets 27 and 28 at each end of the shaft holder and down and up to where the ends are attached to mechanical stop 24. Thus, as drive motor rotates, the mechanism is pulled up or down depending on the direction of motor rotation.

Shaft 22 is fastened to frame 32 by suitable brackets 33 on each end. Frame 32 is attached to frame 34 rigidly, but in a manner that will permit frame 32 to be moved, if desired, up or down on frame 34. This extra movement permits streaks to be cut at greater heights on trees. Frame 34 is fixed rigidly to the prime mover using appropriate bracing and mounts 35.

The operation of the apparatus will be described next. Upon selecting a tree to be streaked and the location on the tree where the streak is desired, the operator of the prime mover to which the apparatus is fastened aligns the prime mover so that as it passes by the tree the cutter head 1 will strike the center of the tree. The operator then activates power source 31 momentarily to raise or lower the cutter head as desired. Next he activates the cutter head through power source 2 and proceeds to drive by the tree. The cutter head 1 will contact the tree first, but since it is mounted in box 3 which is spring loaded and rolls on wheels in box 4, the cutter head will be "pushed back" into box 4 as the prime mover moves forward, until the shield 36 comes into contact with the tree. Spring 21 will tend to keep shield 36 snug against the tree by exerting a strong force on bracket 19 and thus framework 18. springs 6 will tend to push the cutter head into the bark.

As the prime mover continues to move past the tree, the apparatus will be forced to rotate about shaft 22 and box 4 will be forced to rotate in bearings 9, but the springs 6 will continue to push the cutter head into the bark. Further travel of the prime mover will "pull" the shield, still snug against the tree, around the tree while the cutter head removes the bark.

The cutter head will continue to move around the tree for approximately one-third of the tree circumference. When a line tangent to the trailing edge of the shield 36 becomes parallel with the direction of travel of the prime mover, the cutter head will move away from the tree automatically due to spring forces. At this point, spring 21 is compressed and spring 11 is in torsion. As the prime mover continues on past the tree, spring 21 will cause the apparatus to return to its normal position perpendicular to the direction of travel, and spring 11 will cause box 4 to return to its normal position, ready for approach to the next tree.

A small farm tractor is a convenient prime mover. The apparatus was designed for mounting abeam the right side of a small four-wheel tractor, perpendicular to the direction of tractor travel and extended about 3 feet beyond the outer edge of the rear wheel of the tractor.

The rotary cutter head can be faced with any rugose abrasive that will accomplish the requisite bark abrading function.

A particularly convenient rotary cutter head consists of two commercially available molding heads fitted with one inch blades. The molding heads are stacked axially to produce a two inch streak.

If a planer blade type cutter head is selected the sum of the rake and sharpness angles should total ninety degrees (i.e. rake angle 30° and sharpness angle 60°). A lesser sharpness angle penetrates too deeply. A greater sharpness angle will not insure bark penetration.

But streaking is produced using a cutter head speed of about 4000 r.p.m.

Hydraulic motors are convenient for powering both the cutter head and the closed loop chain the raises and lowers the apparatus. The hydraulic motors can be driven from the tractor hydraulic system. A hydraulic volume of about 8 gallons per minute at 600 p.s.i. will power the cutter head. A lesser volume will suffice to operate the closed loop chain system.

As an adjunct operation, a chemical treatment or stimulant can be automatically sprayed on the freshly streaked tree by using a nozzle aimed directly behind the cutter head and actuated via contact between the apparatus and the tree.

Having thus described my invention, I claim:

1. An apparatus for abrading a selected area of bark from the trunk of a vital tree; said apparatus adapted to be mounted and operationally transported aboard a mobile, speed and direction controllable prime mover and said apparatus consisting of the integrated components recited infra in ordered sequence from the prime mover proximal principal apparatus support to the tree proximal, bark abrading, rotary cutter head:

principal apparatus support comprising a vertically disposed boom in the form of a rigid, unobstructed rod member of preselected length and with a journaled surface, said rod member secured top and bottom to one side of a prime mover about at the abeam location;

oscillatory horizontal boom with inboard end attached to the said vertical boom rod member via dual function slip and rotary bearings, the thus suspended horizontal boom afforded a horizontal oscillatory freedom of about ninety degrees abaft a normal abeam position relative the prime mover together with a vertical positioning capability within and journaled unobstructed andjournaled limits of the vertical boom rod member, said horizontal boom comprising a first yoke and a second yoke, paired with the closed faces of the yokes opposed and attached through a journal and bearing pivot link, said pivot link adapted to afford relative pivotal rotation of the yokes within the approximate limits of ninety degrees to either side of a normal vertically parallel position of the paired and pivot linked yokes, the said first yoke proximal the vertical boom provided with two coaxial bearings, one each on either yoke arm end, the said bearings horizontally disposed with vertically coaxial bores journaled to the vertical boom rod member as recited above, the said second yoke provided with paired coaxial counterposed pivot bearings, one each on either yoke arm end, and carrying therebetween, journaled rectangulary symmetrical to the paired pivot bearings and within the yoke arms, with clearance provided for about one hundred and eighty degrees of free rotation around the pivot bearings, a first rectangular box-like receptacle and therewithin a second similar and sensibly smaller rectangular box-like receptacle, the said receptacles severally adapted by virtue of size and by virtue of location on internal rail and roller mounting means to afford reciprocal, sliding, unidirectional, telescopic extending and retracting movement of the said second receptacle within, but not beyond the confines of, the said first receptacle, the face of the said second receptacle open toward the direction of extending telescopic travel and the corresponding immediately adjacent face of the said first receptacle contour curved, vertically concave, thereby to provide an approximate matching surface for operational tree trunk contact, the curved face of said first receptacle provided with a horizontally disposed rectangular slot of dimensions sufficient to allow rotational clearance therethrough for an approximately ninety circular degree, peripheral, chord shaped portion of a horizontally disposed rotary cutter head of preselected size; bark abrading component in the form of a rotary cutter head, disc shaped with curved peripheral surface bladed or selectively abrasive, together with an associated driving motor, both cutter head and driving motor rigidly mounted within the said second receptacle, the rotary cutter head positioned axially vertical and with approximately ninety circular degrees of peripheral, chord shaped cutter head exposure extended beyond the open face confines of the said second receptacle and extended similarly through the afore-recited horizontally disposed, rectangular slot of the said first receptacle and beyond the contour curved face of the said first receptacle at such time as the said receptacles are at the position of maximum telescopic extension, there being substantially no exposure of the cutter head beyond the confines of the said first receptacle at the position of maximum telescopic retraction;

resilient restraining means interposed at all locations intervening adjacent components where relative motion, whether linear or rotational, of the components is required, said resilient restraining means severally adapted to apply a progressively increasing restraint related directly to the degree of relative motion of the adjacent components, said resilient restraining means severally characterized by a minimum degree of restraint that is at least the amount of restraint required to urge the operating rotary cutter head through the bark of a vital tree trunk down to the cambium layer;

means for vertically positioning the horizontal boom components along the rod member of the principal apparatus support in the form of a closed loop roller chain with one sector deployed via idler sprockets adjacently parallel the rod member of the vertical boom, the inboard end of the horizontal boom fixedly attached at one point along the vertical boom parallel deployed sector of said chain, said chain in its entirety actuated via a reversible driving motor and drive sprocket mounted stationary to act on a sector of the closed loop roller chain outside that sector deployed adjacent the vertical boom, operation of the reversible driving motor adapted, selectively to raise, to lower and to operatively position the horizontal boom components along the rod member of the vertical boom and thereby place the rotary cutter head at a preselected height location on the trunk of the tree to be abraded.

2. An apparatus for abrading a selected area of bark from the trunk of a vital tree while mounted and operationally transported aboard a mobile, speed and direction controllable prime mover, said apparatus comprising
  a. cutter head means for abrading bark, said means located on a vertical axis and including a rotary cutter head;
  b. means communicating with said cutter head means for powering said cutter head;
  c. a yoke means for resiliently biasing said cutter head means to a predetermined orientation by the rotation of said yoke means about a horizontal axis passing through the same plane as said vertical axis;
  d. torsion means communicating operatively with said cutter head means and yoke means, said torsion means for resiliently biasing said cutter head means about its axis to a predetermined orientation;
  said cutter head means, said means for powering said cutter head, and yoke means and said torsion means formimg a cutter head assembly;
  e. swing means communicating with said yoke means for resiliently biasing said assembly to a predetermined position in an arc swept by said horizontal axis;
  f. lift means communicating with said swing means for simultaneously moving said swing means and said assembly along an axis substantially parallel to said vertical axis;
  g. means for powering said lift means; and
  h. means for mounting said lift means to said prime mover.

3. The apparatus of claim 2 wherein said lift means comprises a rigid, unobstructed rod having a journaled surface and said means for mounting is located at each end of said rod.

4. The apparatus of claim 3 wherein said lift means communicates with said swing means by way of dual function slip and rotary bearings.

5. The apparatus of claim 4 wherein said swing means comprises (a) a rigid framework connected to said bearings at one end and to said yoke means at the other end and (b) springs located on each side of said which one of thiwh is compressible and one of which is extendable by movement of said swing means from its said predetermined position.

6. The apparatus of claim 5 wherein said torsion means is a spring.

7. The apparatus of claim 6 wherein said yoke means comprises a U-shaped yoke having (a) a rotatable shaft mounted in bearings, said bearingsrigidly attached to said swing means and (b) springs coacting with said yoke and said swing means for resiliently biasing said yoke to its said predetermined position.

8. The apparatus of claim 8 wherein said cutter head means comprises (a) a first frame attached to said yoke means by way of rigid shafts mounted in bearings and (b) a second frame located within said first frame and having wheels thereon to effect movement thereof into and out of said first frame, said rotary cutter head and said means for powering said cutter head disposed within said second frame.

9. The apparatus of claim 8 wherein the means for powering said lift means and cutter head are hydraulic motors.

10. The apparatus of claim 8 further including a shield afixed to said first frame and disposed so as to allow said cutter head to protrude therethrough.

* * * * *